US012762656B2

(12) United States Patent
Roser

(10) Patent No.: US 12,762,656 B2
(45) Date of Patent: Oct. 13, 2026

(54) METHOD FOR SCATTERED RADIATION CORRECTION

(71) Applicant: Siemens Healthineers AG, Forchheim (DE)

(72) Inventor: Philipp Roser, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 212 days.

(21) Appl. No.: 18/816,206

(22) Filed: Aug. 27, 2024

(65) Prior Publication Data

US 2025/0078209 A1 Mar. 6, 2025

(30) Foreign Application Priority Data

Aug. 29, 2023 (DE) ..................... 10 2023 208 270.5

(51) Int. Cl.
*G06T 5/50* (2006.01)
*G06T 5/60* (2024.01)
(Continued)

(52) U.S. Cl.
CPC .................. *G06T 5/50* (2013.01); *G06T 5/60* (2024.01); *G06T 7/0014* (2013.01); *G06T 15/00* (2013.01);
(Continued)

(58) Field of Classification Search
CPC ........... G06T 5/50; G06T 5/60; G06T 7/0014; G06T 15/00; G06T 2200/04;
(Continued)

(56) References Cited

U.S. PATENT DOCUMENTS

2010/0119139 A1* 5/2010 Bertram .................. G06T 12/10 382/131
2016/0012616 A1* 1/2016 Hoernig ................. A61B 6/502 378/37
2016/0100814 A1* 4/2016 Schildkraut .......... A61B 6/5282 382/131
2017/0055931 A1 3/2017 Paysan et al.
(Continued)

FOREIGN PATENT DOCUMENTS

DE 102014007095 A1 11/2015
WO WO 2017035517 A1 3/2017
WO WO 2019002631 A1 1/2019

OTHER PUBLICATIONS

Trapp P. et al.:"Empirical scatter correction: CBCT scatter artifact reduction without prior information". Med Phys. 2022; 1-19. https://doi.org/10.1002/mp.15656.

*Primary Examiner* — Aaron W Carter
(74) *Attorney, Agent, or Firm* — Harness, Dickey & Pierce, P.L.C.

(57) ABSTRACT

A computer-implemented method for scattered radiation correction, comprises: receiving a plurality of projection images mapping an object; receiving or determining a virtual three-dimensional reference image mapping the object; determining at least one scattering model; subtracting the at least one scattering model from the projection images to determine corrected projection images; determining a corrected medical image as a function of the corrected projection images; comparing the corrected image with the virtual reference image; and checking whether an abort criteria is met. If the abort criteria is met, then the corrected medical image is provided. If the abort criteria is not met, then the at least one scattering model is adapted and the method is repeated based on the adapted scattering model.

20 Claims, 3 Drawing Sheets

(51) Int. Cl.
*G06T 7/00* (2017.01)
*G06T 15/00* (2011.01)

(52) U.S. Cl.
CPC ..................... *G06T 2200/04* (2013.01); *G06T 2207/10081* (2013.01); *G06T 2207/10088* (2013.01); *G06T 2207/20081* (2013.01); *G06T 2207/20084* (2013.01); *G06T 2207/20224* (2013.01); *G06T 2207/30004* (2013.01); *G06T 2207/30168* (2013.01); *G06T 2210/41* (2013.01)

(58) Field of Classification Search
CPC . G06T 2207/10081; G06T 2207/10088; G06T 2207/20081; G06T 2207/20084; G06T 2207/20224; G06T 2207/30004; G06T 2207/30168; G06T 2210/41; G06T 12/10; G06T 2211/452; A61B 6/582
See application file for complete search history.

(56) References Cited

U.S. PATENT DOCUMENTS

| | | | | |
|---|---|---|---|---|
| 2017/0116762 | A1* | 4/2017 | Lin | A61B 6/5282 |
| 2017/0150937 | A1 | 6/2017 | Stille et al. | |
| 2020/0134885 | A1* | 4/2020 | Yang | A61B 6/032 |
| 2021/0150702 | A1 | 5/2021 | Claessen et al. | |
| 2021/0330274 | A1* | 10/2021 | Birkhold | A61B 6/5282 |
| 2022/0067988 | A1* | 3/2022 | Schreiber | G06T 12/10 |
| 2024/0245378 | A1* | 7/2024 | Roser | A61B 6/5205 |
| 2025/0032074 | A1* | 1/2025 | Roser | A61B 6/032 |
| 2025/0078209 | A1* | 3/2025 | Roser | G06T 5/50 |
| 2025/0169779 | A1* | 5/2025 | Regensburger | A61B 6/482 |
| 2025/0169780 | A1* | 5/2025 | Roser | A61B 6/5282 |
| 2025/0302419 | A1* | 10/2025 | Roser | A61B 6/5282 |
| 2026/0000377 | A1* | 1/2026 | Roser | A61B 6/5282 |
| 2026/0026767 | A1* | 1/2026 | Roser | A61B 6/5294 |

* cited by examiner

METHOD FOR SCATTERED RADIATION CORRECTION

CROSS-REFERENCE TO RELATED APPLICATION(S)

The present application claims priority under 35 U.S.C. § 119 to German Patent Application No. 10 2023 208 270.5, filed Aug. 29, 2023, the entire contents of which is incorporated herein by reference.

FIELD

Embodiments of the present invention relate to a method for scattered radiation correction in a three-dimensional medical image, a system which is designed to perform this method, a non-transitory computer program product and a non-transitory computer-readable storage medium.

BACKGROUND

It is known to determine or reconstruct a three-dimensional medical image based on a plurality of projection images. The three-dimensional medical image can map an object. The object is positioned between an X-ray source and a detector for this purpose. The projection images map the object from different directions. Such a three-dimensional medical image is therefore based on X-ray imaging of the object.

In addition, it is known that scattered radiation has a major influence on the image quality of such a three-dimensional medical image. In particular, scattered radiation has a major influence on the image quality of three-dimensional medical images which are determined as a function of the projection image captured in cone beam geometry. In cone beam geometry, the object is magnified on the detector depending on its distance from the X-ray tube and its distance from the detector. Such projection images in X-ray imaging are typically recorded with a C-arm. Without correction, the scattered radiation in the three-dimensional medical image can lead to streak artifacts, cupping artifacts and/or smearing artifacts. These artifacts can make a medical diagnosis based on the three-dimensional medical image difficult or impossible. For this reason, it is necessary to reduce and/or correct the scattered radiation.

It is known to position an anti-scatter grid in front of a detector in order to filter out the scattered radiation. However, direct radiation that is not scattered radiation is also filtered out by the anti-scatter grid. This can result in a higher dose being required to achieve the desired image quality.

Alternatively, it is known to provide as large a distance as possible between the object and the detector in order to reduce the scattered radiation in the projection images. However, the magnification in a cone beam geometry means that the area in the object covered by the detector is comparatively small, requiring large and therefore expensive detectors.

Alternatively, it is known to remove or reduce the scattered radiation in the projection images by applying a trained function to the projection images. However, such trained functions are prone to error. This can lead to medically relevant structures also being removed from the projection images and important medical facts in the three-dimensional medical image no longer being recognizable or displayed for this reason.

Alternatively, it is known that the scattered radiation can be modeled by solving the Boltzmann transport equation and corrected in this way in the projection images. However, this method is also prone to error.

Alternatively, it is known to describe or model the scattered radiation using a low-frequency function. Depending on the materials mapped in the three-dimensional medical image and the Hounsfield (acronym: HU) values actually measured or determined, the function modeling the scattered radiation can be adapted iteratively. However, this requires knowledge of the materials of the object. In addition, this method is also prone to error and computationally intensive.

SUMMARY

It is an object of one or more embodiments of the present invention to provide a method by which scattered radiation in a three-dimensional medical image can be reliably corrected without mechanical intervention in the measurement setup.

At least this object is achieved at least by a method for scattered radiation correction in a three-dimensional medical image, by an apparatus for scattered radiation correction in a three-dimensional medical image, by a non-transitory computer program product and by a non-transitory computer-readable storage medium as claimed in the independent claims. Advantageous developments are listed in the dependent claims and in the following description.

At least the object achieved according to embodiments of the present invention is described below both in relation to the claimed apparatuses and in relation to the claimed method. Features, advantages or alternative embodiments mentioned here are likewise to be applied to the other claimed objects and vice versa. In other words, the present claims (which are directed, for example, to an apparatus) may also be further developed with the features described or claimed in connection with a method. The corresponding functional features of the method are thereby formed by corresponding objective modules.

Independent of the grammatical term usage, individuals with male, female or other gender identities are included within the term.

An embodiment of the present invention relates to a method for scattered radiation correction in a three-dimensional medical image. The method comprises a method step for receiving a plurality of projection images. The projection images map an object. The method comprises a method step for receiving or determining a virtual three-dimensional reference image. The virtual, three-dimensional reference image maps the object. The method comprises a method step for determining at least one scattering model. The method comprises a method step for subtracting the at least one scattering model from the plurality of projection images. A plurality of corrected projection images is determined. The method comprises a method step for determining a corrected three-dimensional medical image as a function of the plurality of corrected projection images. The method comprises a method step for comparing the corrected three-dimensional medical image with the virtual three-dimensional reference image, a quality parameter being determined. The method comprises a method step for checking, based on the quality parameter, whether an abort criterion is met. If the abort criterion is met, the method comprises a method step for providing the corrected three-dimensional medical image. If the abort criterion has not been met, the method comprises a method step for adapting the scattering model as a function of the quality parameter and repeating the method steps based on the adapted scattering model.

In the method step for receiving the plurality of projection images, the plurality of projection images is received via an interface. The plurality of projection images maps an object from different directions. In other words, two projection images of the plurality of projection images map the object from two different directions in each case. The object can be a human or an animal or an object. In particular, the object can be a part of the human or a part of the animal or a part of the object.

The projection images are captured in particular via X-ray imaging. The object is positioned between an X-ray tube or X-ray source or radiation source and an X-ray detector or detector. This arrangement is referred to as a measuring arrangement hereinafter. X-rays or radiation emitted by the X-ray tube penetrate the object, are attenuated in their intensity depending on a material of the object and an energy of the radiation and are captured or detected by the detector.

The X-ray tube and/or the detector are designed to rotate around the object within a certain angular range. The angular range can be, for example, 90° or 100° or 120° or 150° or 180° or 210° or 240° or 270° or 300° or 330° or 360°.

In particular, the measuring arrangement forms a cone beam geometry. In other words, the object is magnified onto the detector depending on its distance from the X-ray tube and its distance from the detector.

In the method step for receiving or determining the virtual three-dimensional reference image, the virtual three-dimensional reference image is received via the interface or determined by the computing unit. The virtual three-dimensional reference image maps the object three-dimensionally. The virtual three-dimensional reference image is advantageously free of artifacts caused by scattered radiation or the artifacts caused by scattered radiation are reduced in the virtual three-dimensional reference image.

Based on the plurality of projection images, a three-dimensional medical image can be determined which maps the object in three dimensions. The virtual three-dimensional reference image maps the object analogously to the three-dimensional medical image. In other words, the three-dimensional medical image and the virtual three-dimensional reference image are registered.

In the method step for determining the at least one scattering model, the at least one scattering model is determined by the computing unit. Alternatively, an initial scattering model can be retrieved from a database.

Each projection image of the plurality of projection images comprises a plurality of pixels which are arranged in a matrix. Each pixel comprises a pixel value which depends on an intensity of the X-rays measured at the location of the pixel. The at least one scattering model comprises an analogous number of pixels arranged in an analogously dimensioned matrix. Each pixel of the scattering model comprises a pixel value.

In the method step for subtracting the at least one scattering model from the plurality of projection images, the scattering model is subtracted from each projection image by the computing unit. In this case, the pixel value of the pixel of the scattering model corresponding to the position of the pixel in the matrix of the projection image according to its position in the matrix is subtracted from each pixel value of a pixel of a projection image.

The plurality of corrected projection images is determined.

In the method step for determining the corrected three-dimensional medical image, the corrected three-dimensional medical image is determined on the basis of the plurality of corrected projection images. Corrected three-dimensional medical image is determined analogously to the three-dimensional medical image. In particular, the corrected three-dimensional medical image can be determined via a filtered rear projection based on the plurality of corrected projection images.

In the method step for comparing the corrected three-dimensional medical image with the virtual three-dimensional reference image, the quality parameter is determined by the computing unit. The quality parameter indicates a similarity between the corrected three-dimensional medical image and the virtual three-dimensional reference image.

In the method step for checking whether the abort criterion has been met, the computing unit is used to determine whether the abort criterion has been met based on the quality parameter. The abort criterion can, for example, specify a target value for the quality parameter. The abort criterion is met if the quality parameter falls below the target value. Alternatively, the abort criterion can be met if the quality parameter exceeds the target value. Alternatively or additionally, in an iterative method as described below, the abort criterion may specify a maximum number of iterations. Alternatively or additionally, the abort criterion may specify a minimum difference between two quality parameters from successive iterations. If the difference between two quality parameters from two successive iterations is smaller than the minimum difference, the abort criterion is met.

The abort criterion may comprise one of the abort criteria described or an "or" combination of these abort criteria.

If the abort criterion is met, the method comprises the method step for providing the corrected three-dimensional medical image via the interface.

If the abort criterion is not met, in the method step for adapting the at least one scattering model by the computing unit, the scattering model is adapted as a function of the quality parameter. In particular, the at least one scattering model is advantageously adapted in such a way that when the quality parameter is determined again, it comes closer to the abort criterion. The method steps are then repeated based on the adapted scattering model. In particular, the method steps of subtracting the at least one scattering model from the plurality of projection images, determining the corrected three-dimensional medical image, comparing the corrected three-dimensional medical image with the virtual three-dimensional medical image, and checking are performed again based on the adapted scattering model.

In particular, these method steps are executed iteratively until the abort criterion is met.

The inventor has recognized that based on a virtual three-dimensional reference image, the scattered radiation in the plurality of projection images can be corrected and in this way the scattered radiation or the resulting artifacts in the three-dimensional medical image can also be corrected. The inventor has recognized that it is therefore not necessary to adapt the measurement setup and in this way the measurement setup can be optimized with regard to dose and magnification. The inventor has also recognized that with the method described, no knowledge of the object is necessary. The inventor has recognized that the method described can be used to ensure that medically relevant structures are not erroneously removed from the three-dimensional medical image in the course of correction.

According to an aspect of embodiments of the present invention, the quality parameter is based on a structural similarity value.

In particular, the corrected three-dimensional medical image and the virtual three-dimensional reference image comprise a plurality of voxels which are arranged in a three-dimensional matrix, each comprising a voxel value. The three-dimensional matrices of the voxel of the corrected three-dimensional medical image and the virtual three-dimensional reference image are identical in their dimensions.

The structural similarity value is known as the structural similarity index measure (acronym: SSIM). The structural similarity value is determined as a function of the mean value of the voxel values and the standard deviation of the voxel values of the corrected three-dimensional medical image and the virtual three-dimensional reference image.

The inventor has recognized that the structural similarity value is a good and standardized measure to evaluate the quality of the corrected three-dimensional medical image.

According to an alternative, optional aspect of embodiments of the present invention, the quality parameter is based on an alternative clearance.

For example, the quality parameter can be based on a mean square deviation between the voxel values of two corresponding voxels of the corrected three-dimensional medical image and the virtual three-dimensional reference image. Corresponding voxels are arranged at the same position in the three-dimensional matrix. In particular, the quality parameter can be a square root of the sum of the square deviations of all voxels.

The inventor has recognized that various measures are suitable for evaluating the quality of the corrected three-dimensional medical image. The inventor has recognized that, depending on the computing power and the type of quality assessment, the desired measure can be used to determine the quality parameter.

According to a further aspect of embodiments of the present invention, a scattering model is determined for each projection image of the plurality of projection images.

In particular, an individual scattering model is determined for each of the projection images. The individual scattering models can be at least partially identical. In particular, at least two scattering models of two different projection images can be different.

The inventor has recognized that the method can be used to flexibly determine different scattering models for different projection images. The inventor has recognized that various conditions which may occur when the X-ray tube and the detector rotate around the object can be taken into account in the process. In particular, different conditions can be taken into account by the different scattering models when capturing the different projection images from the different directions.

According to a further aspect of embodiments of the present invention, the at least one scattering model is based on a low-frequency signal or on basis functions.

In particular, the low-frequency signal or the low-frequency function can be designed as described in Trapp, P, Maier, J, Susenburger, M, Sawall, S, Kachelrieß, M. Empirical scatter correction: CBCT scatter artifact reduction without prior information. Med Phys. 2022; 1-19. https://doi.org/10.1002/mp.15656.

In particular, the basis functions can be so-called basis splines or B-splines.

The inventor has recognized that the scattering model can model the scattered radiation with simple functions. The inventor has recognized that standard functions can initially be assumed for this purpose. In this way, the same output or start for the scattering model can be selected for each measurement setup.

According to a further aspect of embodiments of the present invention, the plurality of projection images are projection images captured during an intervention.

In other words, the projection images were captured during an intervention. In other words, the projection images were captured intra-interventionally.

The intervention was carried out or performed on the object. In particular, the intervention can be a medical intervention. For example, the intervention can be a catheter examination or a stent procedure, etc.

The inventor has recognized that, in particular, projection images captured during an intervention are affected by scattered radiation as the dose should be as low as possible during the intervention, the projection images should be captured as quickly as possible, and the geometry of the measurement setup is limited. The inventor has recognized that these conditions in particular make subsequent scattered radiation correction necessary.

According to a further aspect of embodiments of the present invention, the plurality of projection images maps the object from different directions in a cone beam geometry.

In other words, to capture each projection image, the object is projected onto the detector from a different direction. In other words, for each projection image, the object is aligned differently with regard to the detector and/or the X-ray tube.

The cone beam geometry magnifies the object onto the detector depending on its distance from the X-ray tube and its distance from the detector.

In particular, the plurality of projection images may have been captured via a C-arm.

The inventor has recognized that projection images in a cone beam geometry are particularly affected by the scattered radiation. The inventor has also recognized that, in order to determine a three-dimensional medical image, the object must be projected from different directions.

According to a further aspect of embodiments of the present invention, the virtual three-dimensional reference image is a computed tomography image.

The computed tomography image was captured using a computed tomography system. The computed tomography image maps the object.

In particular, a three-dimensional medical image of the object was determined based on the plurality of projection images. In particular, the computed tomography image was referenced with the three-dimensional medical image. In other words, the computed tomography image was aligned with the three-dimensional medical image in such a way that both images map the object in the same way or with the same orientation.

In particular, the method for this purpose may comprise in advance a method step for registering the computed tomography image with the three-dimensional medical image, the virtual three-dimensional reference image being determined.

In particular, the computed tomography image may have been recorded or captured pre-interventionally or before the intervention.

The inventor has recognized that a computed tomography image can be assumed to be almost free of scattered radiation. The inventor has recognized that the computed tomography image can be used as a virtual three-dimensional reference image. The inventor has recognized that a computed tomography image of the object is often captured pre-interventionally. The inventor has recognized that this can be used as a virtual three-dimensional reference image and, in this way, no additional recordings or creation of a reference image are necessary. The inventor has recognized that a possibly different orientation of the object in the computed tomography image and the three-dimensional medical image can be compensated by registration.

According to a further aspect of embodiments of the present invention, the virtual three-dimensional reference image is determined on the basis of a magnetic resonance tomography image.

The magnetic resonance tomography image is captured using a magnetic resonance tomography system. The magnetic resonance tomography image maps the object.

In particular, a three-dimensional medical image of the object was determined based on the plurality of projection images. In particular, the method for this may comprise in advance a method step for registering the magnetic resonance tomography image with the three-dimensional medical image, the virtual three-dimensional reference image being determined.

The magnetic resonance tomography image comprises a plurality of voxels arranged in a matrix which corresponds to the matrix of the (corrected) three-dimensional medical image or has the same dimensions. Each voxel of the matrix comprises a voxel value. When determining the virtual three-dimensional reference image, a voxel value is derived for each voxel based on the voxel value of the magnetic resonance tomography image which would be expected if an analog image of the object were captured via X-rays.

In particular, the magnetic resonance tomography image may have been acquired pre-interventionally.

The inventor has recognized that the virtual three-dimensional reference image can be determined based on a magnetic resonance tomography image. The inventor has recognized that, based on the voxel values of the magnetic resonance tomography image, voxel values can be derived which would be expected from an image captured with X-rays. The inventor has recognized that in this way a magnetic resonance tomography image captured in advance can serve as the basis for the virtual three-dimensional reference image and thus no additional recording of the virtual three-dimensional reference image is necessary. The inventor has recognized that by registering, a possibly deviating positioning of the object in the magnetic resonance tomography image from the three-dimensional medical image can be corrected.

According to a further aspect of embodiments of the present invention, the method comprises a method step for applying a first trained function to the magnetic resonance tomography image, the virtual three-dimensional reference image being generated.

In general, a trained function mimics cognitive functions which humans associate with human thinking. In particular, training based on training data allows the trained function to adapt to new circumstances and to recognize and extrapolate patterns.

In general, parameters of a trained function can be adjusted by training. In particular, supervised training, semi-supervised training, unsupervised training, reinforcement learning and/or active learning can be used for this purpose. In addition, representation learning (alternatively termed feature learning) can be used. In particular, the parameters of the trained functions can be adapted iteratively through a plurality of training steps.

In particular, a trained function can comprise a neural network, a support vector machine, a random tree or a decision tree and/or a Bayesian network, and/or the trained function may be based on k-means clustering, Q-Learning, genetic algorithms and/or association rules. In particular, a trained function can comprise a combination of a plurality of uncorrelated decision trees or an ensemble of decision trees (random forest). In particular, the trained function can be determined via XGBoosting (extreme Gradient Boosting). In particular, a neural network can be a deep neural network, a convolutional neural network or a convolutional deep neural network. Furthermore, a neural network can be an adversarial network, a deep adversarial network and/or a generative adversarial network. In particular, a neural network can be a recurrent neural network. In particular, a recurrent neural network can be a network with long short-term-memory (LSTM), in particular a Gated Recurrent Unit (GRU). In particular, a trained function may comprise a combination of the approaches described. In particular, the approaches described here for a trained function are called network architecture of the trained function.

In particular, the first trained function can be a transformer network or a vision transformer network or a convolutional network or a multilayer perceptron or a general adversarial network (acronym: GAN).

In particular, the first trained function is trained by providing as training input data magnetic resonance tomography images of a plurality of objects to which the first trained function is applied. In addition, corresponding X-ray-based three-dimensional images of the objects are provided as training output data. In each case, one image of the training output data corresponds to one image of the training output data. Two corresponding images are registered to each other and map the same object in the same position. When applying the first trained function to an image of the training output data, an output image is determined. This is compared with the corresponding image of the training output data. The first trained function is then adapted in such a way that when the first trained function is applied again, the image determined in this way better matches the corresponding image of the training output data.

The inventor has recognized that the virtual three-dimensional reference image can be determined by applying a first trained function to a corresponding magnetic resonance tomography image. The inventor has recognized that, in this way, an image determined by a different imaging modality can be modified to resemble the three-dimensional medical image captured using a different imaging modality.

According to a further aspect of embodiments of the present invention, the virtual three-dimensional reference image is determined via a heuristic algorithm based on the magnetic resonance tomography image.

In particular, the heuristic algorithm is applied to the magnetic resonance tomography image and the virtual three-dimensional reference image is determined in this way. In particular, a heuristic algorithm known for this purpose can be applied to the magnetic resonance tomography image for this purpose.

The inventor has recognized that, as an alternative to the first trained function, a heuristic algorithm can be used to determine the virtual three-dimensional reference image.

According to a further aspect of embodiments of the present invention, the virtual three-dimensional reference image is determined on the basis of a three-dimensional medical image. Here, the three-dimensional medical image is based on the plurality of projection images.

In particular, the virtual three-dimensional reference image is derived from the three-dimensional medical image. The three-dimensional medical image is corrected by a first estimated scattered radiation correction.

The inventor has recognized that the virtual three-dimensional reference image can be determined on the basis of the three-dimensional medical image. It is therefore not necessary to capture another medical image. In this way, time and costs can be saved. In addition, it is not necessary to apply further radiation to the object and thus a higher dose. The inventor has recognized that registration can be dispensed with if the virtual three-dimensional reference image is derived from the three-dimensional medical image. In this way, potential errors caused by referencing can also be avoided.

According to a further aspect of embodiments of the present invention, the method comprises a method step for receiving or determining the three-dimensional image. The method also comprises a method step for applying a second trained function to the three-dimensional medical image, the virtual three-dimensional reference image being determined.

In the method step for receiving the three-dimensional medical image, the three-dimensional medical image is received via the interface. The three-dimensional medical image is based on the plurality of projection images. In particular, the three-dimensional medical image was determined or reconstructed as a function of the plurality of projection images as described above.

In the alternative method step for determining the three-dimensional medical image, the three-dimensional medical image is determined by a computing unit as a function of the plurality of projection images. In particular, the three-dimensional medical image can be determined via a filtered rear projection of the plurality of projection images.

The three-dimensional medical image maps the object in three-dimensions.

The second trained function can be designed, in particular, as described above with regard to the first trained function. The second trained function is in particular a Generative Adversarial Network (acronym: GAN). The second trained function is designed to remove scattered radiation in the three-dimensional medical image.

The second trained function is trained by providing three-dimensional medical image data of various objects as training input data and providing the three-dimensional medical image data corrected for scattered radiation as training output data. An image of the training input data and an image of the training output data always form a pair which maps the same object. The second trained function is applied to the training input data for training. The images determined in this way are each compared with the training output data associated in pairs with the training output data. Based on the comparison, the second trained function is adapted in such a way that when the second trained function is applied again, the images determined in this way better match the training output data.

The inventor has recognized that known GANs can be used for scattered radiation correction in order to create or determine the virtual three-dimensional reference image. In particular, it is not relevant whether smaller medically relevant structures of the object are not correctly represented in the virtual reference image determined in this way as this does not correspond to the corrected three-dimensional medical image. The inventor has recognized that the method described can be used to ensure that all structures are correctly represented in the corrected three-dimensional medical image.

According to a further aspect of embodiments of the present invention, the abort criterion is met when the quality parameter falls below a target value.

In particular, falling below the target value means a particularly high degree of similarity between the (corrected) three-dimensional medical image and the virtual reference image. The target value is predetermined. The quality parameter describes a difference between the virtual three-dimensional reference image and the corrected three-dimensional reference image.

Alternatively, the abort criterion can also be met when the target value is exceeded if the quality parameter is defined elsewhere.

Alternatively or additionally, the abort criterion can also be met if, as described above, a maximum number of iterations or runs of the method have been carried out and/or if the quality parameter changes by less than a predetermined threshold value between the iterations.

In particular, the different types of abort criteria may form a common abort criterion by terminating the method and providing the corrected three-dimensional medical image when at least one of the conditions is met.

The inventor has recognized that a quality of the scattered radiation correction can be predetermined on the basis of the abort criterion. The inventor has recognized that it is possible to combine different abort criteria in order to avoid carrying out the method an infinite number of times if the quality parameter does not converge.

An embodiment of the present invention also relates to a system for scattered radiation correction in a three-dimensional medical image. The system comprises an interface and a computing unit. The interface and the computing unit are designed to perform the following method steps:

receiving a plurality of projection images, the projection images mapping an object, receiving or determining a virtual three-dimensional reference image, the virtual three-dimensional reference image mapping the object, determining at least one scattering model, subtracting the at least one scattering model from the plurality of projection images, a plurality of corrected projection images being determined, determining a corrected three-dimensional medical image as a function of the plurality of corrected projection images, comparing the corrected three-dimensional medical image with the virtual three-dimensional reference image, a quality parameter being determined, checking, based on the quality parameter, whether an abort criterion is met, if the abort criterion is met:

providing the corrected three-dimensional medical image, if the abort criterion is not met:

adapting the at least one scattering model as a function of the quality parameter, repeating the method steps based on the adapted scattering model.

In particular, such a system can be designed to carry out the previously described method for scattered radiation correction in a three-dimensional medical image and aspects thereof. The system is designed to carry out this method and aspects thereof in that the interface and the computing unit are designed to carry out the corresponding method steps.

An embodiment of the present invention also relates to a non-transitory computer program product with a computer program and a non-transitory computer-readable medium. A largely software-based implementation has the advantage that systems already in use can also be easily retrofitted with a software update in order to work in the manner described. In addition to the computer program, such a computer program product may optionally include additional components such as, for example, documentation and/or additional components, as well as hardware components such as, for example, hardware keys (dongles, etc.) for using the software.

In particular, an embodiment of the present invention also relates to a non-transitory computer program product comprising a computer program which can be loaded directly into a memory of a system having program sections to carry out all the method steps of the method described above for scattered radiation correction in a three-dimensional medical image and aspects thereof when the program sections are executed by the system.

In particular, an embodiment of the present invention relates to a non-transitory computer-readable storage medium on which program sections readable and executable by a system are stored to perform all the method steps of the method described above for scattered radiation correction in a three-dimensional medical image and aspects thereof when the program sections are executed by the system.

BRIEF DESCRIPTION OF THE DRAWINGS

The properties, features and advantages of the present invention described above will become clearer and more understandable in connection with the following figures and their descriptions. The figures and descriptions are not intended to limit the present invention and its embodiments in any way.

In different figures, identical components are provided with corresponding reference characters. The figures are generally not to scale.

In the drawings:

Figure 1:
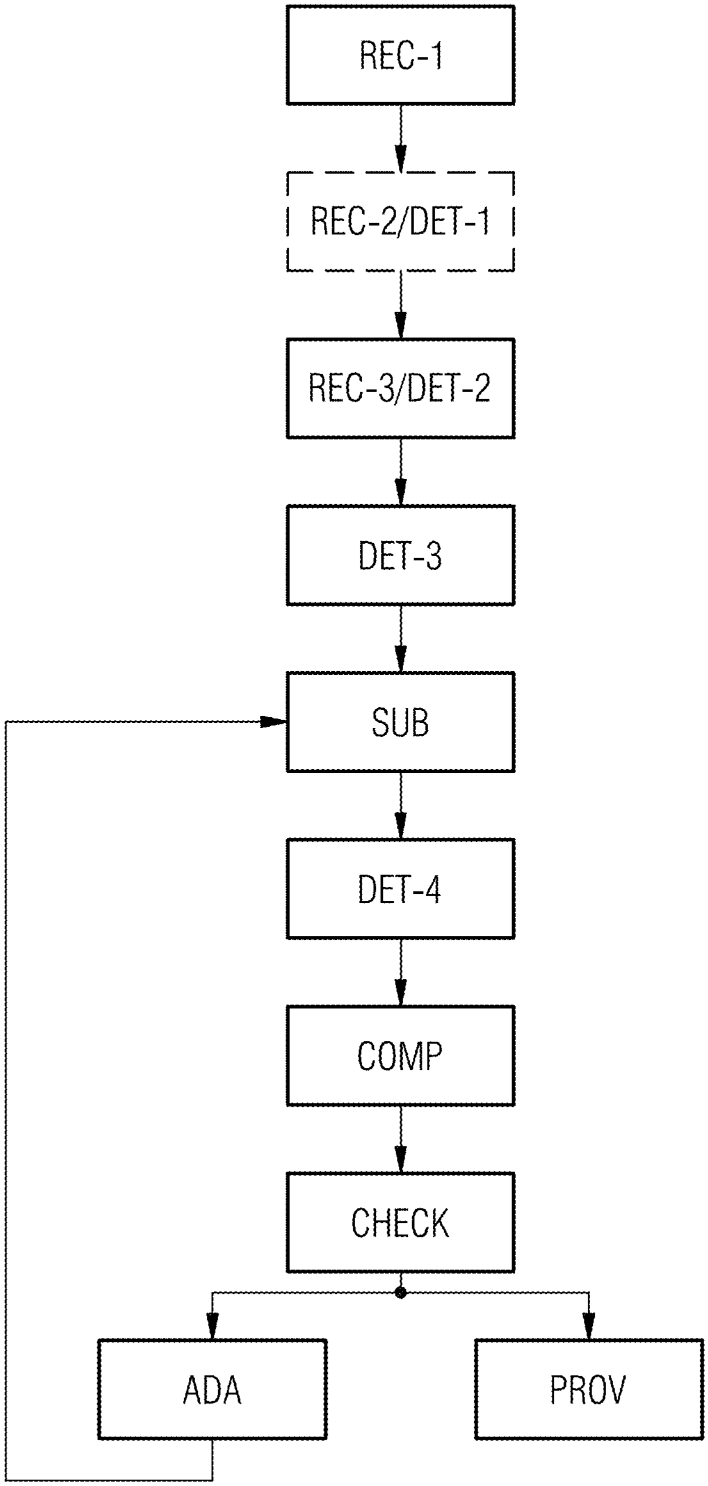
Figure 2:
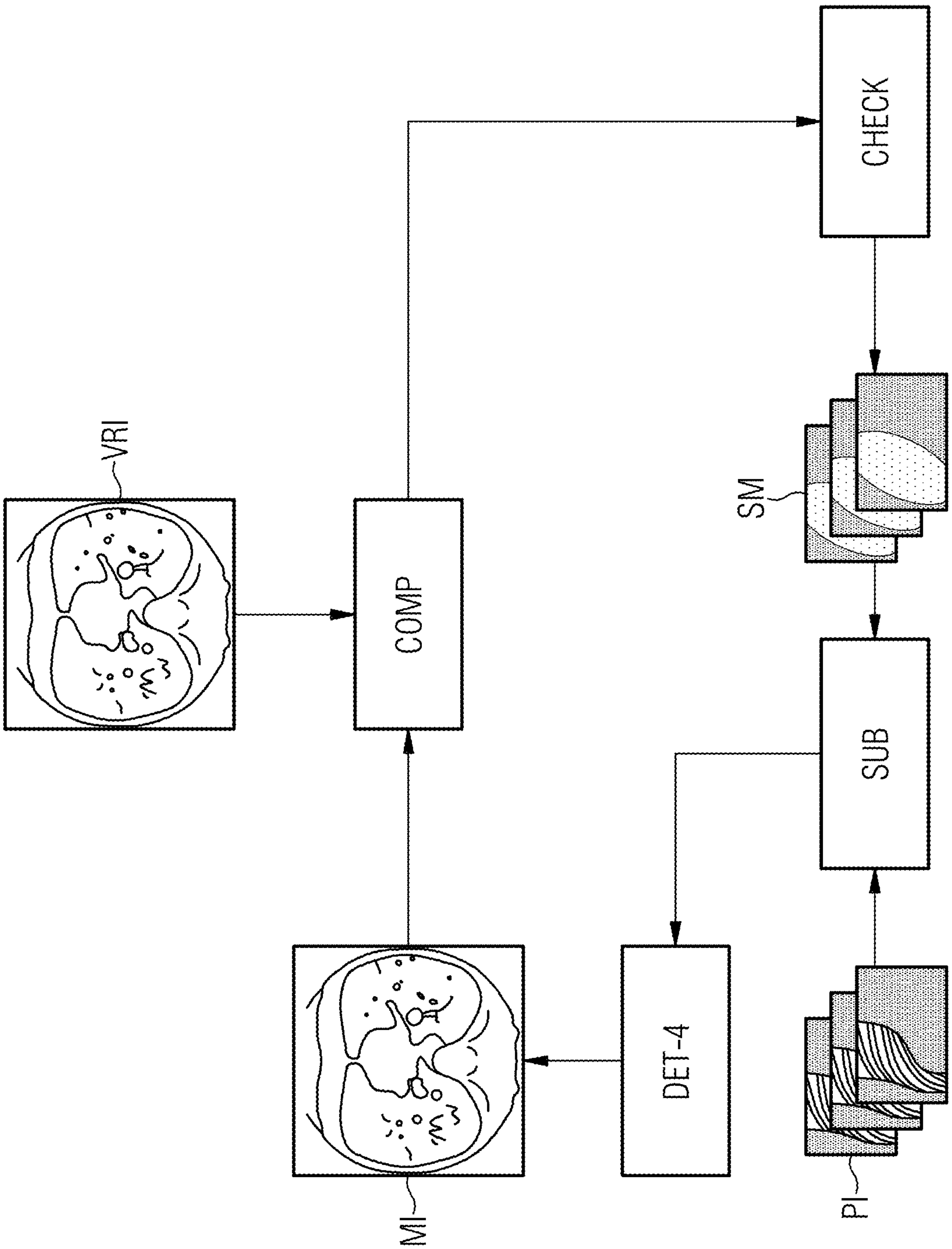
Figure 3:
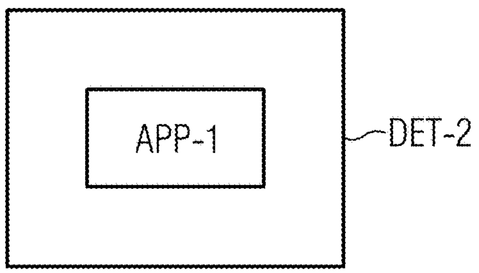
Figure 4:
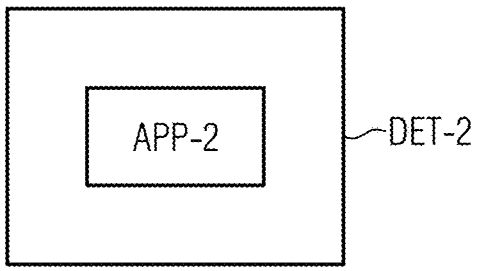
Figure 5:
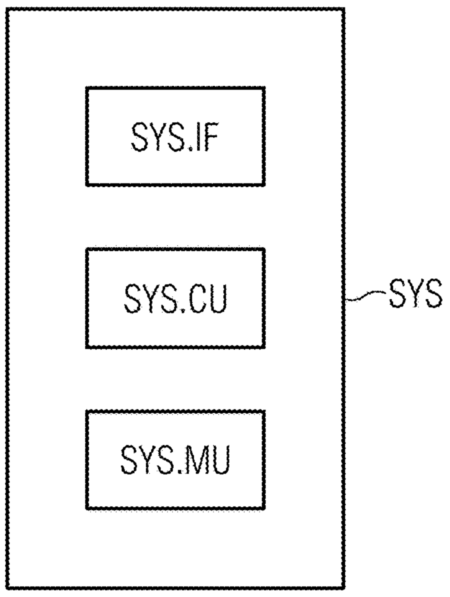

FIG. 1 shows a first exemplary embodiment of a method for scattered radiation correction in a three-dimensional medical image, FIG. 2 shows a second exemplary embodiment of a method for scattered radiation correction in a three-dimensional medical image, FIG. 3 shows a first exemplary embodiment of a method step for determining a virtual three-dimensional reference image, FIG. 4 shows a second exemplary embodiment of a method step for determining a virtual three-dimensional reference image, FIG. 5 shows a system for scattered radiation correction in a three-dimensional medical image.

DETAILED DESCRIPTION

FIG. 1 shows a first exemplary embodiment of a method for scattered radiation correction in a three-dimensional medical image MI.

The method comprises a method step for receiving REC-1 from a plurality of projection images PI. The plurality of projection images PI maps an object. In each case, two projection images PI map the object from two different directions. In particular, the projection images PI are two-dimensional X-ray images of the object. In particular, the projection images PI may have been captured using a C-arm or an adjustable X-ray system or a computed tomography system. In particular, the plurality of projection images PI may have been captured in a cone beam geometry. The object is arranged between a radiation source, in particular an X-ray source, and a detector, the object being magnified onto the detector as a function of its distance from the detector and the radiation source.

The object can be a human or an animal or an object. In particular, the object can be a part of a human or an animal or an object.

In an optional method step for receiving REC-2 or determining DET-1, a three-dimensional medical image MI can be received or determined. The three-dimensional medical image MI is based on the plurality of projection images PI. In particular, when determining DET-1, the three-dimensional medical image MI can be determined based on the plurality of projection images PI. For example, the three-dimensional medical image MI can be determined from the plurality of projection images PI via filtered rear projection.

Alternatively, the three-dimensional medical image MI can be determined in advance as described based on the plurality of projection images PI. The three-dimensional medical image MI determined in this way can then be received, for example from a database. The three-dimensional medical image MI maps the object in three dimensions.

The method comprises a further method step for receiving REC-3 or determining DET-2 a virtual three-dimensional reference image VRI. The virtual three-dimensional reference image VRI maps the object. In particular, the virtual three-dimensional reference image VRI and the three-dimensional medical image MI are registered to each other. In other words, the virtual three-dimensional reference image VRI and the three-dimensional medical image MI map the object from the same perspective with the same orientation. The virtual three-dimensional reference image VRI comprises less scattered radiation than the three-dimensional medical image MI. The virtual three-dimensional reference image VRI may have been determined or captured in advance and subsequently received for the method. Alternatively, the virtual three-dimensional reference image can be determined. For example, the virtual three-dimensional reference image VRI can be determined based on the three-dimensional medical image MI. Alternatively, the virtual three-dimensional reference image can be determined based on an alternative measurement of an image data set of the object. In particular, the virtual three-dimensional reference image VRI can be a computed tomography image of the object. In particular, this computed tomography image can be captured using a computed tomography system with as little noise as possible due to scattered radiation. Alternatively, the virtual three-dimensional reference image VRI can be based on a magnetic resonance tomography image or on the three-dimensional medical image MI.

The method comprises a further method step for determining DET-3 at least one scattering model SM. The scattering model SM describes an approximation of the scattered radiation. In particular, a separate scattering model SM can be determined for each projection image PI. In particular, the scattering model SM can be based on a low-frequency polynomial or signal, or a basis function.

The method comprises a further method step for subtracting SUB of the at least one scattering model SM from the plurality of projection images PI. If a separate scattering model SM has been determined for each projection image PI, the corresponding scattering model SM is subtracted from each projection image PI. This determines a plurality of corrected projection images.

Each of the projection images PI comprises a plurality of pixels which are arranged in a matrix or pixel matrix. Each pixel comprises one pixel value. The at least one scattering model SM likewise comprises a plurality of pixels arranged in a matrix whose dimensions correspond to those of the matrices of the projection images PI. Each of these pixels likewise comprises one pixel value. When subtracting SUB, the pixel values corresponding to their position in the matrix are subtracted from each other.

In addition, the method comprises a method step for determining DET-4 from a corrected three-dimensional medical image MI as a function of the plurality of corrected projection images. In particular, the corrected three-dimensional medical image MI is determined, for example, via filtered rear projection based on the corrected projection images.

The method also comprises a method step for comparing COMP the corrected three-dimensional medical image MI with the virtual three-dimensional reference image VRI. In particular, both the corrected three-dimensional medical image MI and the virtual three-dimensional reference image VRI comprise a plurality of voxels which are arranged in a three-dimensional matrix or voxel matrix. The dimensions of both these voxel matrices are identical. Each of the voxels comprises one voxel value. When comparing, the voxel values of two voxels corresponding to one another according to their positions in the voxel matrices are compared with one another. A quality parameter is determined in the process.

The quality parameter can, for example, depend on a square distance of the voxel values. Alternatively, the quality parameter can be based on a structural similarity value.

The method comprises another method step for checking CHECK whether an abort criterion is met, based on the quality parameter. In particular, the abort criterion can be met if the quality parameter exceeds or falls below a predefined value.

The method comprises a method step for providing PROV the corrected three-dimensional medical image MI if the abort criterion is met. In particular, the corrected three-dimensional medical image MI can be provided via an interface SYS. IF. In particular, the corrected three-dimensional medical image MI of a database and/or a display unit for displaying the three-dimensional medical image MI of a person can be provided.

If the abort criterion is not met, the method comprises the method steps for adapting ADA the at least one scattering model SM as a function of the quality parameter and the repetition of the method steps based on the adapted scattering model SM.

When repeating the method steps, in particular the method steps for subtracting SUB, determining DET-4 the corrected three-dimensional medical image MI, comparing COMP and checking CHECK based on the adapted scattering model SM are carried out again. Based on checking again, it is again determined whether the method steps must be repeated with a further adapted scattering model SM, or whether the abort criterion has been met and the corrected three-dimensional projection image determined in this way is provided.

FIG. 2 shows a second exemplary embodiment of a method for scattered radiation correction in a three-dimensional medical image MI.

The schematic sequence of the method described in FIG. 1 is shown. The method steps for comparing COMP, checking CHECK, subtracting SUB and determining DET-4 the corrected three-dimensional medical image MI are designed according to the description of FIG. 1.

FIG. 3 shows a first exemplary embodiment of a method step determining DET-2 a virtual three-dimensional reference image VRI.

The virtual three-dimensional reference image VRI is based on a magnetic resonance tomography image. When determining DET-2 the virtual three-dimensional reference image VRI, a first trained function is applied to the magnetic resonance tomography image in a method step of application APP-1. The virtual three-dimensional reference image VRI is generated. The first trained function is designed as described above. In particular, the first trained function may comprise a transformer network or a convolutional network or a generative adversarial neural network or multilayer perceptrons. In particular, the first trained function may have been trained by reinforcement learning.

Alternatively, the virtual three-dimensional reference image VRI can be determined via a heuristic algorithm based on the magnetic resonance tomography image.

FIG. 4 shows a second exemplary embodiment of a method step determining DET-2 a virtual three-dimensional reference image VRI.

In particular, the virtual three-dimensional reference image VRI is based on the three-dimensional medical image MI. In particular, the method step for receiving REC-2 or determining DET-1 of the three-dimensional medical image MI is not optional.

The method then comprises a method step for applying APP-2 a second trained function to the three-dimensional medical image MI. The virtual three-dimensional reference image VRI is determined. The second trained function is designed as described above. In particular, the second trained function comprises a Generative Adversarial Neural Network (GAN). In particular, the second trained function is trained to remove noise or scattered radiation from the three-dimensional medical image MI.

FIG. 5 shows a system SYS for scattered radiation correction in a three-dimensional medical image MI.

The illustrated system SYS for scattered radiation correction in a three-dimensional medical image MI is designed to carry out a method, according to embodiments of the present invention, for scattered radiation correction in a three-dimensional medical image MI. The system SYS comprises an interface SYS.IF, a computing unit SYS.CU and a memory unit SYS.MU.

In particular, the system SYS can be a computer, a microcontroller or an integrated circuit (IC). Alternatively, the system SYS can be a real or virtual computer network (a technical term for a real computer network is “cluster”, a technical term for a virtual computer network is “cloud”). The system SYS can be designed as a virtual system which is executed on a computer or a real computer network or a virtual computer network (a technical term is “virtualization”).

The interface SYS. IF can be a hardware or software interface (for example, a PCI bus, USB or FireWire). The computing unit SYS.CU may comprise hardware and/or software components, for example a microprocessor or a so-called FPGA (Field Programmable Gate Array). The memory unit SYS.MU can be designed as a non-permanent Random Access Memory (RAM) or as a permanent mass storage device (hard disk, USB stick, SD card, Solid State Disk (SSD)).

In particular, the interface SYS. IF may comprise a plurality of sub-interfaces which execute different method steps of the respective method according to embodiments of the present invention. In other words, the interface SYS. IF can be designed as a plurality of interfaces SYS.IF. In particular, the computing unit SYS.CU may comprise a plurality of sub-computing units which carry out different method steps of the respective method according to embodiments of the present invention. In other words, the computing unit SYS. CU can be designed as a plurality of computing units SYS.CU.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Where not yet explicitly done, but expedient and in the sense of the present invention, individual exemplary embodiments, individual aspects or features thereof may be combined or interchanged without departing from the scope of the present invention. Advantages of the present invention described with reference to one exemplary embodiment also apply to other exemplary embodiments without being explicitly mentioned, where transferable.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A computer-implemented method for scattered radiation correction in a three-dimensional medical image, the computer-implemented method comprising:

receiving a plurality of projection images, wherein the plurality of projection images map an object;

receiving or determining a virtual three-dimensional reference image, wherein the virtual three-dimensional reference image maps the object;

determining at least one scattering model;

subtracting the at least one scattering model from the plurality of projection images to determine a plurality of corrected projection images;

determining a corrected three-dimensional medical image as a function of the plurality of corrected projection images;

comparing the corrected three-dimensional medical image with the virtual three-dimensional reference image to determine a quality parameter;

checking, based on the quality parameter, whether an abort criteria is met;

providing the corrected three-dimensional medical image in response to the abort criteria being met; and in response to the abort criteria not being met, adapting the at least one scattering model as a function of the quality parameter, and repeating the computer-implemented method based on the adapted at least one scattering model.

2. The method as claimed in claim 1, wherein the quality parameter is based on a structural similarity value.

3. The method as claimed in claim 1, wherein a scattering model is determined for each projection image of the plurality of projection images.

4. The method as claimed in claim 1, wherein the at least one scattering model is based on a low-frequency signal or basis functions.

5. The method as claimed in claim 1, wherein the plurality of projection images are projection images captured during an intervention.

6. The method as claimed in claim 1, wherein the plurality of projection images map the object from different directions in a cone beam geometry.

7. The method as claimed in claim 1, wherein the virtual three-dimensional reference image is a computed tomography image.

8. The method as claimed in claim 1, wherein the virtual three-dimensional reference image is determined based on a magnetic resonance tomography image.

9. The method as claimed in claim 8, further comprising:

applying a first trained function to the magnetic resonance tomography image to generate the virtual three-dimensional reference image.

10. The method as claimed in claim 8, wherein the virtual three-dimensional reference image is determined via a heuristic algorithm based on the magnetic resonance tomography image.

11. The method as claimed in claim 1, wherein the virtual three-dimensional reference image is determined based on the three-dimensional medical image, and wherein the three-dimensional medical image is based on the plurality of projection images.

12. The method as claimed in claim 11, further comprising:

receiving or determining the three-dimensional medical image; and applying a second trained function to the three-dimensional medical image to determine the virtual three-dimensional reference image.

13. The method as claimed in claim 1, wherein the abort criteria is met when the quality parameter falls below a target value.

14. A system for scattered radiation correction in a three-dimensional medical image, the system comprising:

an interface and a computing unit, wherein the interface and the computing unit are configured to cause the system to carry out a method including receiving a plurality of projection images, wherein the plurality of projection images map an object, receiving or determining a virtual three-dimensional reference image, wherein the virtual three-dimensional reference image maps the object, determining at least one scattering model, subtracting the at least one scattering model from the plurality of projection images to determine a plurality of corrected projection images, determining a corrected three-dimensional medical image as a function of the plurality of corrected projection images, comparing the corrected three-dimensional medical image with the virtual three-dimensional reference image to determine a quality parameter, checking, based on the quality parameter, whether an abort criteria is met, providing the corrected three-dimensional medical image in response to the abort criteria being met, and in response to the abort criteria not being met, adapting the at least one scattering model as a function of the quality parameter, and repeating the method based on the adapted at least one scattering model.

15. A non-transitory computer program product including a computer program configured to be loaded into a memory of a system, the computer program having program sections that cause the system to carry out the computer-implemented method of claim 1 when the program sections are executed by the system.

16. A non-transitory computer-readable storage medium storing computer-executable instructions that, when executed by a computing unit at a system, cause the system to perform the computer-implemented method of claim 1.

17. The method as claimed in claim 2, wherein a scattering model is determined for each projection image of the plurality of projection images.

18. The method as claimed in claim 2, wherein the virtual three-dimensional reference image is determined based on the three-dimensional medical image, and wherein the three-dimensional medical image is based on the plurality of projection images.

19. The method as claimed in claim 18, further comprising:

receiving or determining the three-dimensional medical image; and applying a second trained function to the three-dimensional medical image to determine the virtual three-dimensional reference image.

20. The method as claimed in claim 19, wherein the abort criteria is met when the quality parameter falls below a target value.

* * * * *